United States Patent

Vogel et al.

[11] 4,053,076
[45] Oct. 11, 1977

[54] COATINGS FOR SHATTERPROOFING GLASS BOTTLES

[75] Inventors: Richard W. Vogel, Vernon Hills; Nick N. Suciu, IV, Lake Bluff; Milton A. Glaser, Glencoe; John A. Szwedo, Waukegan, all of Ill.

[73] Assignee: The Dexter Corporation, Windsor Locks, Conn.

[21] Appl. No.: 692,469

[22] Filed: June 3, 1976

[51] Int. Cl.$^2$ .................... B65D 11/16; B32B 9/00
[52] U.S. Cl. .................... 215/12 R; 215/DIG. 6; 428/35; 428/215; 428/423; 428/424; 428/425
[58] Field of Search ............ 428/35, 215, 216, 423, 428/424, 425; 215/12 R, DIG. 6

[56] References Cited

U.S. PATENT DOCUMENTS

| | | | |
|---|---|---|---|
| 3,823,032 | 7/1974 | Ukai | 428/35 |
| 3,825,142 | 7/1974 | Campagna | 215/DIG. 6 |
| 3,877,969 | 4/1975 | Tatsumi et al. | 428/35 |
| 3,886,226 | 5/1975 | Asai et al. | 260/77.5 AM |
| 3,889,031 | 6/1975 | Tatsumi et al. | 428/35 |
| 3,912,100 | 10/1975 | Graham et al. | 215/DIG. 6 |

*Primary Examiner*—William R. Dixon, Jr.

*Attorney, Agent, or Firm*—Merriam, Marshall, Shapiro & Klose

[57] ABSTRACT

The present invention relates to a glass bottle coated with a multi-layer protective film comprising high polymer substances, and a method for producing such a coated glass bottle. More particularly, the invention is concerned with a glass bottle designed for containing carbonated beverages such as soft drinks or beer, wherein the beverages must be maintained under pressurized conditions, said bottle being coated on its outer wall by spraying or otherwise applying a plurality of protective films. Still more particularly, the present invention is directed to a "return-type" glass bottle for carbonated beverages such as soft drinks and beer, wherein the glass bottles are designed for repeated use, each cycle of which requires washing and sterilizing steps prior to filling.

The present invention also provides for a method for coating the glass bottle with protective films which will prevent or retard the scattering of glass fragments when the bottle is broken due to internal pressure exerted by the pressurized gas within the bottle, or due to external forces such as impact. The coatings of the present invention are adapted to prevent the scattering of glass fragments around the surrounding area in the event a coated bottle breaks or explodes.

28 Claims, No Drawings

COATINGS FOR SHATTERPROOFING GLASS BOTTLES

BACKGROUND

The prior art has described various systems of prolonging the durability of glass bottles against possible breakage. Most prior art systems involve the application of various organic polymeric coatings to the glass bottles. Much of the prior art has been directed to imparting scratch resistance and abrasion resistance to such glass bottles.

In reality, breakage of bottles containing carbonated beverages such as soft drinks and beer or the like often takes place due to internal pressure exerted by the pressurized gas in the carbonated beverages, as well as breakage caused by impact caused by external force. The impact may occur not only during the course of production and distribution of the merchandised product, but also occurs as a result of handling bottles by consumers. Either type breakage may result in scattering of glass particles and consequent injury to humans.

Thus, while the heretofore known coatings are largely concerned with the prolongation of the durability of the glass bottles by surface treatments, as well as by application of protective film to the bottle surface, the present invention proposes to use a multi-layer protective film, of which the inner protective film on the bottle wall surface comprises a soft elastic coating which possesses good adhesion to the glass, surrounded by a hard, tough abrasion resistant outer film in contrast to the prior art teachings that only moderate adhesion to the glass is desired, for purposes of shatterproofing the coating composition (see U.S. Pat. No. 3,823,032). It has been found that substantial adhesion between the inner coating and the glass wall is necessary in order for a coated bottle to pass the washing test and the other tests to which returnable bottles must be subjected.

The prior art has proposed that the adhesive strength of the elastic film on the wall surface of glass articles be reduced, to some extent, with a view towards preventing broken glass from scattering. However, it has been found that bottles coated with compositions that do not have good adhesion between the glass and the protective coatings do not pass the washer test required for return bottles.

The glass retentive coatings described in the prior art, are translucent to some degree. The present invention describes a coating system which is completely transparent, and, in fact optically enhances the apperance of the bottle compared to that of an uncoated container.

The present invention provides a coating system for glass bottles, and particularly for bottles containing carbonated beverages, such as soft drinks or beer, which exert an internal gas pressure against the bottle wall, wherein the bottle is coated with layers of two distinct polyurethane composition films, which not only prevent the glass fragments from scattering upon breakage, but which coating compositions can survive the washing and sterilizing process so that the coated bottles will be effective for multiple return trips to the bottling plant. Thus the coating compositions of the present invention provide glass bottles which are shatterproof, are abrasion resistant, and are capable of being washed in strong hot caustic washing solution a plurality of times.

In the commercial manufacture of bottles which are used in the beverage industry, such as beer bottles and pop bottles, it is necessary to visually inspect the bottles to locate and remove any defective bottles, before they are shipped to the bottling plants. In the commercial production of beverage bottles, the bottles are first formed from molten glass, then they are molded and shaped, after which they are annealed. As the bottles emerge from the cold end of the annealing oven, the bottles are sprayed with a so-called "cold end lube" which is a waxy material, for the purpose of lubricating the surface of the bottles. It is necessary to lubricate the surface of the bottles so that the bottles can be handled by automatic machinery, which conveys the bottles to the inspection stations where they are visually inspected. Although different types of "cold end lubes" are presently used on bottles, most of these are polyethylene emulsions. Others include fatty acids and soaps thereof such as stearic acid or the calcium salts of stearic acid.

While it is possible to apply the coating compositions of the present invention to bottles which have a "cold end lube" on the glass surface, best results in terms of repeated cycles of caustic wash have been obtained when the coating compositions of the present invention are applied to bottles having glass surfaces uncontaminated with "cold end lube". Therefore in order to obtain a coated bottle having the maximum caustic wash resistance, it is preferred to apply coating compositions of the present invention to bottles which are made without a "cold end lube" or which have had the "cold end lube" washed off prior to the application of the coatings.

SUMMARY OF THE INVENTION

The present invention contemplates coating the glass bottles with two layers, hereinafter called the base coat and the top coat. The base coat is a soft elastic polyurethane polymer having good adhesion to glass. While good adhesion is not required with respect to shatterproofing or glass retention, in order to pass the abrasion tests, and the washing tests defined below, good adhesion between the base coat and the glass is required. It is generally desired that the base coating form a monolithic film having good adhesion to the glass and having a high elasticity as well as a low glass transition temperature. Necessarily, the base coating must be compatible with a top coat and must have the minimum effect on optical properties. The base coat does not require any particular lubricity.

The top coating, on the other hand, must be a hard, tough polyurethane which is substantially abrasion resistant and insensitive to caustic. Further it is desired that the top coat have a low coefficient of friction in order to give the coated bottle the lubricity required by automatic filling machines. Still further, the top coating must be capable of wetting the base coat and be compatible therewith in order to obtain a good bond between the base coat and the top coat. The top coat must also be a monolithic coating with good weather resistance. If necessary, slip agents may be added to the top coat in order to promote lubricity.

DETAILED DESCRIPTION OF INVENTION

Base Coat

As was mentioned above, the base coat must be a soft, elastic polyurethane coating formed by reacting a polyisocyanate with a polyol. The polyisocyanate must be a liquid, preferably having a low vapor pressure, and preferably it is approximately difunctional. It is preferred to use the liquid aromatic diisocyanates of the MDI type and products made therefrom. Good results have been obtained using a commercial product known as Mondur-PF, which displays excellent freeze-thaw stability. It is understood that this material is about 50% by weight of an adduct of tripropylene glycol and methylene diphenyl diisocyanate mixed with 50% by weight of MDI, and having an overall equivalent weight of 183. Similar MDI-type derivatives such as Isonate 143L and Mondur-CD can be used. Aliphatic polyisocyanates are generally unsuitable because of the high cost involved.

The polyols used in the base coat generally should have functionalities between two and three with average molecular weights between 300 and 1000. It is generally desired to have the functionality of the polyol package above 2 but less than 3 with an equivalent weight between 100 and 500. The difunctional polyols tend to produce a coating composition having poor slip and a tendency to cling to the glass, but which has good tear resistance and elongation. The presence of the triol portion lends compatability with the top coat. It has been found that the polyol mixture should have a high average equivalent weight, since the lower equivalent weight materials cause a coating to become brittle at low temperatures. As will be apparent to those skilled in the art, any coating which is brittle does not provide adequate shatterproofing.

When the average equivalent weight of the polyol approaches 600, it may be advisable to increase the NCO to OH ratio of the base coat, in order to obtain the desired properties. Generally the base coat is formulated to give a highly extensible material having only a modest tensile strength. When the higher equivalent weight polyols are employed, increased isocyanate quantities may be necessary in order to maintain the minimum film strengths. It is also desired that the base coating composition have a low glass transition temperature, although this is modified somewhat since a low temperature also reduces the internal pressure of a bottle.

Useful results have been obtained by using polyether polyols comprising a mixture of polyols predominating in difunctional polyethers. As shown below in the examples, particularly useful results have been obtained using a commercial polyether difunctional polyol having a hydroxy equivalent weight of 387, sold under the designation P-710, blended on a 3 to 1 weight ratio with a commercial polyether triol having a hydroxy equivalent weight of 243 sold under the name TP-740. It has been found that by blending these materials at a 3:1 weight ratio a useful polyol is prepared. In addition to the polyether polyols described above and in the examples, other polyols could be used, including polyesters, capro-lactones, rubber-type hydroxy containing polymer such as the hydroxylated polybutadienes, hydroxylated polystyrenes and others.

The present invention requires the addition of silane adhesion promoters to the base coating in order to improve the adhesion of the base coat to the glass. The silane adhesion promoters may be conveniently mixed with the polyol portion of the base coat system. The silane adhesion promoters are particularly important if a cold end lubricant is present on the surface of the glass bottle. It has been found that various organo-functional trialkoxy silanes function effectively as adhesion promoters. The silane sold as A-189, a mercapto silane, may be used to promote adhesion, and is preferred. Other silanes such as those commercially available as A-187, an epoxy functional silane, may also be used to improve adhesion. Generally it has been found that approximately 2% by weight of a silane adhesion promoter should be used, based on the solids composition of the coating, although as much as 4% by weight may be used.

In preparing base coats for use on return bottles, it is essential to include an ultraviolet light absorber such as the benzotriazole-type absorbers which are known in the art, although other types of UV absorbers may be used. The UV absorbers of the benzotriazole type present some difficulties in uniformly dispersing the absorber throughout the coating. It has been found that the UV absorbers can be dissolved, along with heating, to form a solution, which is thereafter added to the polyols. It may be convenient to add the catalysts to the UV absorber-solvent solution in order to assist in dispersing the catalyst throughout the polyol system.

It has been found that from about 1 to 2% by weight of the UV absorber, based on the weight of the solids of the base coating, gives the best results, although from 0 to 4% by weight of the UV absorber may be used. Increasing the UV absorber level to more than 4% by weight does not markedly improve the protection, and simply raises the cost of the overall composition and most of the UV absorbers are quite expensive. Furthermore, more than 4% may result in a softer coating composition which lacks the requisite extensibility.

It has been found that a number of different types of catalyst can be used to promote the urethane formation, but dibutyl tin dilaurate is presently favored. Generally, it has been found that from about zero to 0.2% by weight of a dibutyl tin dilaurate catalyst may be used, but a catalyst level in the lower end of the range is generally preferred in order to avoid solvent entrapment and/or pot life problems.

In making up the base coat, it is generally desired to adjust the overall NCO:OH ratio to about 1.1:1.0. While this ratio may be varied somewhat, coating compositions containing less than 1.1:1 NCO:OH ratio tend to be too weak. Although it may be advantageous to increase the NCO:OH ratio when the equivalent weight of the polyol is relatively high, increasing the relative amount of NCO component will not significantly affect the physical properties of the coating composition, but the overall cost of the composition will increase.

The viscosity of the base coat may be reduced by the use of any solvent which does not react with the components of the coating composition. The level of solvent used depends on the solvency of the solvent and the application method to be used. It is generally preferred to keep the solvent quantity as low as possible, consistent with the application technique.

The base coating may be applied to bottles by any convenient technique. It has been found that the coating, particularly when used in combination with as much as 20% by weight of solvents, may be sprayed on a pre-heated bottle using two component spray equipment or it may be applied using electrostatic discs and the like. The coating composition can be used at 100% solids using dipping techniques. If desired, as much as 20% by volume of exempt solvents, such as those defined in Illinois Rule 205, may be added to the composition in order to produce the proper application viscosity.

Top Coat

The top coat is also a polyurethane based film produced using the same type of isocyanates as is used in the base coat, but the polyol package of the top coat is primarily a triol, in order to give a harder, tougher coating composition which will pass the hot caustic wash testing. Although polyether polyols are generally preferred, other types of polyols may be used, such as polyesters, polycaprolactones and the like. Good results have been obtained using a triol sold under the designation TP-440, a polyether triol having an equivalent weight of 142.

Preferably the top coat is made using an NCO:OH ratio of about 1.1:1. It is generally felt necessary that an NCO:OH ratio of at least 1.0:1 must be used in order to prevent a soft film. Higher ratios than 1.1:1 may be used, and will give harder films, but they are progressively more expensive.

It has been found desirable to add a slip agent to the top coat, in order to promote lubricity. Certain types of diols, which will partially cure into the coating composition, have been found to be effective slip agents. In particular, a polypropylene glycol having a molecular weight of about 1200, when used at about 2% based on the solid level, has improved lubricity. Most commercial slip agents cause foaming which produces a cloudy coating. Conventional defoamers have been tried, but the resulting appearance is not acceptable since an opaque film is produced.

For use on return bottles, the top coat must also contain an antioxidant which functions as an oxygen scavenger and retards premature film erosion during the extended periods of outdoor exposure that returnable bottles are likely to encounter. A substituted benzophenone, commercially available under the name Irganox 1010, has shown good results. The amount of antioxidant used may vary over substantial limits. Good success has been achieved using about 1% by weight of Irganox 1010 which is chemically identified as tetrakis[methylene 3-(3',5'-di-tert-butyl-4'-hydroxy phenyl) propionate] methane.

As was the case in the base coat, it is essential that the top coat contain an ultraviolet light absorber, preferably of the benzotriazole type, particularly for those coatings which are to be used on return bottles. While it is preferred to use 2% by weight of the UV absorber in the top coat, any amount up to about 4% may be used. It has been further found that the ratio of UV absorber to antioxidant should be approximately 2 to 1 by weight, in order to get best weathering performance.

If desired, pigments may be added to the coating composition in order to produce colored coating compositions.

It is generally desired to use a catalyst in the top coat which can range in quantity from 0 to 0.5% by weight. The same types of catalyst such as the dibutyl tin dilaurate used in the base coat may be used with the top coat.

Various types of solvents may be used to increase the fluidity of the polyol package. Any solvent which does not react with the components of the composition may be used. The level of solvent used depends on the solvency the solvent and the method of application for which the coating composition is designed. Preferably the solvent system includes some "slow" solvent, such as octyl alcohol, in order to provide time for volatilization of all solvents prior to the curing of the film. Generally the coating compositions illustrated by the examples are applied at 80% solids (by volume).

METHOD OF PREPARING COATING

Both of the coating compositions preferably employ UV absorbers in relatively small amounts which are difficult to uniformly disperse throughout the coating composition. It is preferred that the UV absorber and the antioxidant are first dissolved in a small amount of solvent, along with some heating, if required. After these have been dissolved in the solvent, the catalyst may be added and thoroughly dispersed in this solution. Finally this mixture is added to the polyols.

The top layer is applied to the bottle having the base layer cured thereon in much the same manner as the base layer is applied. Then the bottle with both layers applied thereto is subject to a second curing operation.

The coating compositions are applied to the bottle in any convenient manner. They can be mixed immediately prior to spraying, and it has been found convenient to use a dual component mixing nozzle. Generally it is desired to cure the coating composition at as low temperature as possible in order to effect energy savings. Generally the bottles are preheated to a temperature of 250° F. and are baked for a finite period of time for each coating. It is generally preferred to bake the base coating about 4 minutes at 250° F. and the top coating about 8 minutes at 250° F.

Generally it is desired that the overall thickness of both coatings be from 6 to 9 mils, wherein each coating comprises about half of the thickness. The bottle temperature controls the thickness of the coating to some extent. Generally, if the temperature is too low, i.e., substantially below 250° F., a thinner coating results. The coating should cover the entirety of the bottle surface up to the threads.

TESTING PROCEDURE

In order to produce commercially acceptable return bottles, the coated bottles must pass three fundamental tests which are namely the glass retention test upon breaking, the caustic wash and wear test and the lubricity test.

The glass retention test is conducted by breaking in some manner a bottle which is filled with water and charged with carbon dioxide. Conventionally, a bottle is filled cold and charged with sufficient carbon dioxide to generate 60 psig at 20° C.

I. Lubricity Test

The lubricity of the surface of the bottle is an important parameter with respect to handling bottles and automatic filling machinery. While the required lubricity is somewhat difficult to define mathematically, tests have been devised which at least emperically measure the lubricity of a bottle. An example of a commercially cured lubricity test is to pile three bottles, on their sides, to form a small pyramid. The two bottom bottles are held together. The pyramid is then inclined to see when the top bottle slides off the other two bottles. Movement of the bottle at 20° or less inclination indicates adequate lubricity.

II. Caustic-Wear Test

For bottles which are designed for use more than once, i.e., returnable bottles, it is essential that any coating on the bottle be able to resist the washing operation to which bottles must be subjected to before filling, as well as to resist the abrasion which occurs when the bottle is fed through a bottling line. The caustic/wear resistance test outlined below tests the ability of torn or cut coatings (thus exposing bare glass) to resist caustic undercutting or loosening of the adhesion bonds between the coating and the glass, as a result of caustic exposure at the tear or cut. The caustic/wear resistance test is as follows:

STEP 1

Using a sharp knife, prepare four sample bottles to represent coating damage as follows:
A. On the first bottle, remove a square section of coating approximately 5mm + 5mm at the bottle to bottle contact point.
B. On the second bottle, remove a square section of coating approximately 5mm + 5mm from the bottom plate. If not bottom coated repeat A.
C. On the third bottle, make a 25mm long vertical cut in a flute (or in main body of bottle) not in a contact point area.
D. On the fourth bottle, make two crossing 25mm cuts in the form of an "X" on the bottom plate. If not bottom coated repeat C.

STEP 2

A. Select 12 additional unabused samples and add to the four samples of Step 1. Mark each bottle for identification.
B. Fill all 16 bottles with hot (60°-71° C.) water, close and seal.
C. Totally immerse the bottles in alkali washing solution* at 71° C. for 15 minutes.
D. Remove bottles from alkali soak and rinse with tap water.
E. Remove closure and empty.
F. Refill bottles with cold (0°-40° C.) water, cap and seal.
G. Place bottles in line simulator for 5 minutes (run wet). *Washing solution is to consist of 5% caustic (NaOH) 1.5% sodium gluconate and 0.5% trisodium phosphate.

STEP 3

Repeat Step 2 (part B through H) four more times.

III. Fragment Retention

Fragment retention performance data is known to vary widely depending on the conditions under which the bottles are dropped. Some coatings perform best at elevated temperatures, while the reverse may be true for other coatings. Since a wide range of conditions are encountered in the field, and the worst condition for a particular coating may not be known in advance, it is necessary to preliminarily examine several states or fill as follows:
A. Normal fill level 8 bottles at 4° C.
B. Normal fill level 8 bottles at 22° C.
C. Normal fill level 8 bottles at 49° C.
D. 2/3 fill level 8 bottles at 4° C.

Eight new samples are to be evaluated under each of the four above conditions, after which an additional 16 samples will be dropped under only one of the above conditions. The selective condition chosen is left to the discretion of those performing the test, but normally would be that condition which, for example, is felt to be more representative of the particular geographic area involved, or perhaps the specific test which resulted in the poorest performance (omit selection of the 2/3 full test).

The intent of this procedure is to increase the sample size and, at the same time, re-examine the area of most concern.

The following examples will serve to illustrate the preparation of several shatterproof bottle coatings adapted for use on return bottles, but it is understood that these examples are set forth merely for illustrative purposes and that many other coatings are within the scope of the present invention.

EXAMPLE 1

A base coating was prepared as a two package system. The polyol portion was produced from the following materials:

| | |
|---|---|
| Polyether diol (P-710) | 515.54 grams |
| Polyether triol (TP-740) | 171.85 grams |
| Toluene | 18.63 grams |
| Aromatic solvent mixture | 12.44 grams |
| Cellosolve acetate | 69.29 grams |
| Methyl n-amyl ketone | 58.22 grams |
| Dibutyl tin dilaurate | 0.11 grams |
| | 846.08 grams |

The polyether diol had an equivalent weight of 378, while the polyether triol had an equivalent weight of 243. The polyol portion weighed 8.21 pounds per gallon and contained 81.26% non-volatile material.

The NCO portion of the base coat was a mixture of 50% by weight of MDI with 50% by weight of an isocyanate terminated adduct of MDI and tripropylene glycol. 410.51 grams of the NCO portion was mixed with the above polyol portion to give an NCO:OH ratio of 1.10:1.0 (87.38% NVM) and the mixture was immediately sprayed on a bottle which had been pre-heated to 250° F. The film was cured for 4 minutes at 250° F. to produce a film thickness of 3.5 mils.

A top coat was prepared in a similar manner. The top coat polyol package prepared from the following materials:

| | |
|---|---|
| Polyether triol (TP-440) | 627.55 grams |
| Toluene | 26.16 grams |
| Mixture of aromatic solvents | 17.41 grams |
| Cellosolve Acetate | 97.27 grams |
| Methyl n-amyl ketone | 81.67 grams |
| Dibutyl tin dilaurate | 0.15 grams |
| Total | 850.13 grams |

This polyol portion weighed 8.25 pounds per gallon and contained 73.83% non-volatile material.

The foregoing polyol portion was mixed with 889.62 grams of the isocyanate mixture described above, comprising 50% by weight of MDI, and 50% by weight of an adduct of MDI and tripropylene glycol. This gave an overall NCO:OH ratio of 1.10:1, with the overall coating containing 87.21% NVM.

The mixed top coating was applied to the base-coated bottle, which had been cured to 250° F. The top coat was cured for another 8 minutes at 250° F. to give a film thickness of 3.5 mils with an overall film thickness of 7 mils.

The base coat and top coat described in Example 1 were applied to 3 dozen commercial 32 ounce "Coke" returnable bottles manufactured by Anchor Hocking. These bottles had an average coating thickness of 7.1 mils and an average film weight of 14-15 grams per bottle. The bottles were filled and charged to 60 psi using citric acid and sodium bicarbonate. They were allowed to rest overnight. The next day they were dropped from 4 ft. onto a steel plate in accordance with the Anchor Hocking standard test S-73-0009-48 and S-73-0011-48. The bottle thus showed an average glass retention of more than 99% within a 2 ft. diameter circle around the point of breakage.

EXAMPLE 2

A similar coating composition to that described in Example 1 was produced, but the composition of Example 2 contained an antioxidant and a UV absorber.

The polyol package for the base coat was made as follows:

| | |
|---|---|
| Polyether diol (P-710) | 501.42 |
| Polyether triol (TP-740) | 167.14 |
| Mixture of aromatic solvents | 12.10 |
| Cellosolve acetate | 67.39 |
| Methyl n-amyl ketone | 56.63 |
| Dibutyl tin dilaurate | 0.11 |

Thereafter there was added a premix of the following materials:

| | |
|---|---|
| Toluene | 18.12 |
| Ultraviolet absorber | 21.36 |

The UV absorber is a substituted benzotriazole having the general formula

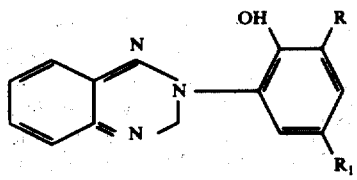

and is described in U.S. Pat. Nos. 3,004,896 and 3,189,615.

The polyol portion weighed 8.20 pounds per gallon and contained 81.73% non-volatile matter. The polyol package was mixed with 399.29 grams of the isocyanate mixture described in Example 1 to give an overall NCO:OH ratio of 1.10:1. The base coat was applied to a bottle in the same manner as described in Example 1.

A top coat was prepared by first producing the following polyol package:

| | |
|---|---|
| Polyether triol (TP-440) | 595.63 grams |
| Mixture of aromatic solvent | 16.53 grams |
| Cellosolve acetate | 92.32 grams |
| Methyl n-amyl ketone | 77.52 grams |
| Dibutyl tin dilaurate | 0.149 grams |

To this mixture was added a premix of 24.83 grams toluene, 13.63 grams of an antioxidant and 27.26 grams of the ultraviolet absorber used in the base coat. The antioxidant used was tetrakis[methylene 3-(3',5'-di-tert-butyl-4'-hydroxyphenyl)propionate]methane and is described in U.S. Pat. Nos. 3,285,855 and 3,644,482. The polyol package weighed a total of 847.79 grams, had a density of 8.23 pounds per gallon and contained 75.90% non-volatile matter.

The polyol portion was blended with 844.38 grams of the isocyanate mixture described in Example 1 to give an overall NCO:OH ratio of 1.10:1.

The coatings described in Example 2 are applied to soft drink bottles in the manner described in Example 1 and perform equivalently. The bottles produced in accordance with Example 2 were exposed to outdoor weather. After 7 months of outdoor exposure, the bottles coated with the formulation shown in Example 2 showed a very slight yellowing, compared to bottles coated with formulation of Example 1 which showed severe yellowing. The yellowing is an indication of change of properties, i.e., reduction in glass retention, since the film becomes more brittle. The bottles coated with the formulation of Example 2 colored to 7.3 NBS color units after 400 hours in the weatherometer, while the control, a coating as described in Example 1, colored to 24.00 NBS color units in the same time. After 1,000 hours, the bottle coated with the formulation of Example 2 colored to only 8.2 NBS units.

Similar experiment was run wherein the formulation included 6% by weight of the ultraviolet absorber and 3% by weight of the antioxidant (3 times the level of Example 2). When such coatings were applied to standard bottles, in the manner of Examples 1 and 2, and placed in a weatherometer, they showed a coloration of 5.2 NBS units after 400 hours and 6.6 NBS units after 1,000 hours. Thus trebling the amount of UV absorber and antioxidant did not greatly improve the weatherability.

EXAMPLE 3

A similar coating composition to that described in Example 2 was produced, but the composition of Example 3 was formulated with solvents which meet the requirements of California Rule 66.

The base coat polyol package was made as follows:

| | |
|---|---|
| Polyether diol (P-710) | 501.42 grams |
| Polyether triol (TP-740) | 167.14 grams |
| Isobutyl acetate | 18.12 grams |
| Mixture of aromatic solvents | 12.10 grams |
| Cellosolve acetate | 67.39 grams |
| Methyl n-amyl ketone | 56.63 grams |
| Dibutyl tin dilaurate | 0.11 grams |
| Ultraviolet absorber | 21.36 grams |
| | 844.27 grams |

These materials weighed 8.20 pounds per gallon and contained 81.73% non-volatile matter. The polyol package was mixed with 399.39 grams of the isocyanate mixture described in Example 1 to give an overall NCO:OH ratio of 1.10:1. The base coat was applied to a bottle in the same manner as described in Example 1.

A topcoat was prepared by first producing a polyol package by mixing the following materials:

| | |
|---|---|
| Polyether triol (TP-440) | 595.63 grams |
| Isobutyl acetate | 24.83 grams |
| Mixture of aromatic solvent | 16.53 grams |
| Cellosolve acetate | 92.32 grams |
| Methyl isoamyl ketone | 77.52 grams |
| Dibutyl tin dilaurate | 0.149 grams |
| Irganox 1010 | 13.63 grams |
| Ultraviolet absorber | 27.26 grams |
| | 847.79 grams |

The topcoat weighed 8.23 pounds per gallon and contained 75.09% non-volatile material. It was blended with 844.38 grams of the isocyanate described in Example 1 to give an overall NCO:OH ratio of 1.1:1.0.

The coating compositions of Example 3 were applied to commercial soft drink bottles, the same conditions and curing parameters as described in Example 1. The film properties were about the same as the properties of the coating of Example 2. Bottles thus coated were run through commercial bottling lines and generally satisfactorily performed for more than 15 cycles.

EXAMPLE 4

The polyol package for the base coating was made up by mixing the following materials:

| Polyether diol (P-710) | 504.30 grams |
| Polyether triol (TP-740) | 168.19 grams |
| Isobutyl acetate | 18.22 grams |
| Mixture of aromatic solvents | 12.17 grams |
| Cellosolve acetate | 67.78 grams |
| Methyl n-amyl ketone | 56.69 grams |
| Dibutyl tin tilaurate | 0.11 grams |
| Ultraviolet absorber | 6.21 grams |
| Epoxyfunctional silane | 12.41 grams |
| | 846.08 grams |

The epoxyfunctional silane was a material sold by Union Carbide under the designation A-187. The polyol package had a weight of 8.22 pounds per gallon and contained 81.67% non-volatile matter.

The above-identified polyol package was mixed with 401.58 grams of the isocyanate described in Example 1 to give an overall NCO:OH ratio of 1.1 to 1. This material was applied to a bottle in the manner described in Example 1.

A top coat was prepared by first producing a polyol package by mixing the following materials:

| Polyether triol (TP-440) | | 588.97 grams |
| Isobutyl acetate | | 24.55 grams |
| Mixture of aromatic solvent | | 16.35 grams |
| Cellosolve acetate | | 91.29 grams |
| Methyl isoamyl ketone | | 76.65 grams |
| Dibutyl tin dilaurate | | 0.15 grams |
| Octyl alcohol | | 29.24 grams |
| Irganox 1010 | | 7.32 grams |
| Ultraviolet absorber | | 14.62 grams |
| Polyethylene glycol (1200 molecular weight) | | 29.24 grams |
| | Total | 878.38 grams |

The top coat weighed 8.24 pounds per gallon and contained 70.05% non-volatile material. It was blended with 844.70 grams of the isocyanate described in Example 1 to give an overall NCO:OH ratio of 1.1 to 1.0. The material was immediately applied to a preheated bottle which had been previously coated with the above-identified base coating.

The presence of the octyl alcohol in the top coat, as shown in the formulation of Example 4, is important since it permits the voltailization of all solvents before the complete curing of the coating. It has been found that for optimum optical clarity, a small amount of octyl alcohol or similar higher alkyl alcohol should be used.

The coatings described in Example 4 were applied to 32 ounce "Coke" bottles, of the return type. The coatings averaged 6–7 mils thick and about 10 to 15 grams of coating per bottle. The bottles were run through a commercial "Coke" plant in Columbus, Ohio, and most successfully completed 25 caustic wash and fill cycles on the production filling line. Although there were some failures noted, there were no failures attributable to the coatings deteriorating on portions of the bottles where the coatings were properly applied.

It has been found that the addition of adhesion promoters to the base coat, such as the silanes described in Example 4, gave coated bottles with slightly improved glass retention properties, as well as bottles which are able to withstand severe caustic washing and rough handling. Although the present invention is predicated on the understanding that the inner coating must be soft and tacky to produce adequate glass retention, the addition of the adhesion promoter apparently does not affect the extensibility of the inner coating, and does not render the inner coating more brittle, and surprisingly, even at lower coating weights, seems to maintain the glass retention properties.

It has been found that bottles coated with the coating compositions described herein have an improved pressure retention property. In addition to providing improved shatterproofing for bottles, the coating compositions of the present invention enable the bottler to use a bottle having thinner wall sections, and thus enable the bottles to be made from less glass. The advantages of using thinner bottles, in addition to the obvious saving of the glass need to produce the bottles, includes lower freight costs on reduced bottle weight and improved shatter retention using the same coating film thickness.

The forms of invention herein shown and described are to be considered only as illustrative. It will be apparent to those skilled in the art that numerous modifications may be made therein without departure from the spirit of the invention or the scope of the appended claims.

We claim:

1. A glass bottle coated with a multilayer covering protective film on its surface and characterized by preventing or retarding broken glass fragments of said bottle from scattering around when the bottle is broken, and further characterized by being capable of providing, if desired, the use of a bottle having a thinner glass wall, said bottle comprising:

a. a glass bottle;
   b. a base coating applied to and having good adhesion to the exterior of said bottle and characterized by being a soft elastic polyurethane polymer which is compatible with a top coating, said base coating comprising a polyurethane resin produced from a liquid aromatic diisocyanate and a polyol mixture, said polyol mixture having an average hydroxy functionality between 2 and 3 with an average molecular weight between about 300 and 1000, said polyurethane having an NCO:OH ratio of not less than about 1.1:1.0 and up to 4% by weight of an organo-functional trialkoxy silane based on the weight of said polyurethane; and
   c. a top coating applied to said bottle over said base coat and characterized by being a hard tough polyurethane polymer which is compatible with said base coating, substantially abrasion resistant and resistant to washing, said top coating comprising a polyurethane resin produced from a liquid aromatic polyisocyanate and a polyol, said polyol being approximately trihydroxy-functional and having a molecular weight between about 300 and 800, the amount of isocyanate and polyol being regulated to give an NCO:OH ratio of at least about 1.1:1.0;

the multi-layer covering protective film provided by (b) and (c) providing a coated glass bottle having a composite coating characterized by preventing or retarding broken glass fragments of said bottle from scattering around when the bottle is broken, and further characterized by being capable of providing, if desired, the use of a bottle having a thinner glass wall.

2. A glass bottle as described in claim 1, wherein the base coating is approximately 3.5 mils thick and the top coating is approximately 3.5 mils thick.

3. A glass bottle as described in claim 1, wherein both the base coat and the top coat include an ultraviolet absorber.

4. A glass bottle as described in claim 3, wherein the UV absorber comprises about 2% by weight of the coating compositions.

5. A glass bottle as described in claim 1, wherein the top coat contains an antioxidant.

6. A glass bottle as described in claim 5, wherein the top coat contains about 1% by weight of antioxidant.

7. A glass bottle as described in claim 1, wherein the organo-functional trialkoxy silane is a mercapto-functional trimethoxy silane.

8. A glass bottle as described in claim 1, wherein the organo-functional trialkoxy silane is an epoxy-functional trimethoxy silane.

9. A glass bottle as described in claim 1, wherein the top coat contains a slip agent.

10. A glass bottle as described in claim 9, wherein the slip agent is a polypropylene glycol having a molecular weight of about 1200.

11. A glass bottle as described in claim 10, wherein the top coat contains about 2% by weight of polypropylene glycol slip agent.

12. A glass bottle as described in claim 11, wherein the top coat is applied from a solution which includes up to 5% by weight of a high molecular weight alkyl alcohol.

13. A glass bottle as described in claim 12, wherein said alcohol is octyl alcohol.

14. The glass bottle as described in claim 1, wherein both the base coat and top coat include an ultra-violet absorber and the top coat includes an antioxidant.

15. A glass bottle coated with a compatible, protective, multi-layer polyurethane coating system characterized by preventing or retarding broken glass fragments of the bottle from scattering upon breakage of the glass bottle, and further characterized by having good resistance to washing and sterilizing operations for repeated use, substantial abrasion resistance and good optical transparency, and still further characterized by being capable of enabling one to provide, if desired, a bottle having a thinner glass wall, which coated glass bottle comprises:

a. a glass bottle;
b. an adherent, monolithic base coating applied to and contacting the exterior wall of the bottle and characterized by being a soft elastic polyurethane polymer having good adhesion to the glass bottle, good optical transparency, and good compatibility with a top coating, said base coating comprising an ultraviolet light absorber and a polyurethane resin produced from a liquid aromatic diisocyanate and a polyol mixture, said polyol mixture having an average hydroxy functionally of between 2 and 3 and average molecular weight of between about 300 and 1000, said polyurethane resin having an NCO-:OH ratio of not less than about 1.1:1.0 and up to about 4% by weight of an organo-functional trialkoxy silane adhesion promoter based on the weight of said base coating; and,
c. a monolithic top coating applied to and directly contacting said base coating and characterized by being a hard tough polyurethane polymer which is substantially abrasion resistant and is resistant to repeated washing, and having substantial weather resistance, good optical transparency, and good compatibility with the base coating, said top coating comprising an ultraviolet light absorber, antioxidant, and a polyurethane resin which is different from the polyurethane resin of (b), said polyurethane resin produced from a liquid aromatic polyisocyanate and polyol, said polyol being approximately trihydroxy-functional and having a molecular weight of between about 300 and 800, the amount of isocyanate and polyol being controlled to provide an NCO:OH ratio of at least about 1.1:1.0;

said base coating having been cured prior to application thereto of said to coating, and said top coating having been cured after being applied to said cured base coating, said base coating and top coating providing two distinct polyurethane composition films;

the cured, multi-layer, protective polyurethane coating system of the coated glass bottle comprising separate layers of (b) and (c), respectively, and being characterized by preventing or retarding broken glass fragments of the bottle from scattering upon breakage of the glass bottle (a), and further characterized by having good resistance to washing and sterilizing operations for repeated use, substantial abrasion resistance and good optical transparency, and still further characterized by being capable of enabling one to provide, if desired, bottles having a thinner glass wall.

16. The coated glass bottle of claim 15 wherein the total thickness of both the base coating and top coating is from about 6 to 9 mils, and each of those coatings is about one-half of that thickness.

17. The coated glass bottle of claim 15 wherein the ultraviolet light absorber in each of the base coating and top coating is present in an amount of up to about 4% by weight of the respective coating in which it is present.

18. The coated glass bottle of claim 15 wherein said base coating is applied to and adheres directly to the exterior glass wall of the bottle not bearing a coating of a cold end lube.

19. The coated glass bottle of claim 15 wherein the polyol mixture of the base coating contains a hydroxy functionality of above 2 but less than 3, and an equivalent weight of between about 100 and 500.

20. The coated glass bottle of claim 15 wherein the organo-functional trialkoxy silane adhesion promoter of the base coating is a mercapto-functional trimethoxy silane.

21. The coated glass bottle of claim 15 wherein the organo-functional trialkyoxy silane of the base coating is an epoxy-functional trimethoxy silane.

22. The coated glass bottle of claim 15 wherein the antioxidant of the top coating is present in an amount of about 1% by weight of the top coating.

23. The coated glass bottle of claim 15 wherein the top coating has a low coefficient of friction.

24. The coated glass bottle of claim 15 wherein the top coating contains a slip agent.

25. The coated glass bottle of claim 24 wherein the slip agent contains a propylene glycol having a molecular weight of about 1200.

26. The coated glass bottle of claim 15 wherein the top coating contains about 2% by weight of polypropylene glycol slip agent.

27. The coated glass bottle of claim 15 wherein the top coating is applied from a solution which includes — up to 5% by weight of a high molecular weight alkyl alcohol.

28. The coated glass bottle of claim 27 wherein said alcohol is octyl alcohol.

* * * * *